(12) United States Patent
Mackinney

(10) Patent No.: US 12,555,496 B2
(45) Date of Patent: Feb. 17, 2026

(54) APPARATUS AND METHOD FOR TEACHING WOUND DEBRIDEMENT

(71) Applicant: The Medical College of Wisconsin, Inc., Milwaukee, WI (US)

(72) Inventor: Theodore George Mackinney, Wauwatosa, WI (US)

(73) Assignee: The Medical College of Wisconsin, Inc., Milwaukee, WI (US)

( * ) Notice: Subject to any disclaimer, the term of this patent is extended or adjusted under 35 U.S.C. 154(b) by 1161 days.

(21) Appl. No.: 17/431,970

(22) PCT Filed: Feb. 19, 2020

(86) PCT No.: PCT/US2020/018873
§ 371 (c)(1),
(2) Date: Aug. 18, 2021

(87) PCT Pub. No.: WO2020/172314
PCT Pub. Date: Aug. 27, 2020

(65) Prior Publication Data
US 2022/0139264 A1    May 5, 2022

Related U.S. Application Data

(60) Provisional application No. 62/808,461, filed on Feb. 21, 2019.

(51) Int. Cl.
*G09B 23/34* (2006.01)
(52) U.S. Cl.
CPC ................... *G09B 23/34* (2013.01)
(58) Field of Classification Search
CPC ........ G09B 23/34; G09B 23/30; G09B 23/00; G09B 25/00

USPC ......................................................... 434/267
See application file for complete search history.

(56) References Cited

U.S. PATENT DOCUMENTS

| | | | |
|---|---|---|---|
| 3,921,311 A | 11/1975 | Beasley et al. | |
| 4,596,528 A * | 6/1986 | Lewis ..................... | G09B 23/30 434/270 |
| 6,780,016 B1 * | 8/2004 | Toly ....................... | G09B 23/285 434/262 |
| 9,972,218 B2 * | 5/2018 | Normand ............... | G09B 23/28 |
| 2009/0098521 A1 | 4/2009 | Kuo et al. | |

(Continued)

FOREIGN PATENT DOCUMENTS

BR   102014033135-2 A2   7/2016
CN   206379096 U         8/2017

OTHER PUBLICATIONS

Vata, "Annie Arterial Insufficiency Leg—0555." VATA Inc. (2023). https://vatainc.com/wp-content/uploads/2023/02/0555-AnnieLegend-e8.pdf (Year: 2023).*

(Continued)

*Primary Examiner* — Xuan M Thai
*Assistant Examiner* — Zachary Joseph Pollock
(74) *Attorney, Agent, or Firm* — Quarles & Brady LLP

(57) ABSTRACT

An apparatus for teaching wound debridement includes a model of a body part and a removable member. The model includes a receiving portion. The removable member is sized and shaped to simulate a wound. The receiving portion is configured to receive the removable member, and the removable member is removably coupled to the model by an attachment device.

20 Claims, 10 Drawing Sheets

(56) References Cited

U.S. PATENT DOCUMENTS

| | | | |
|---|---|---|---|
| 2013/0101973 A1* | 4/2013 | Hoke | G09B 23/30 434/267 |
| 2016/0023819 A1 | 1/2016 | Maldonado | |
| 2016/0293055 A1 | 10/2016 | Hofstetter | |
| 2017/0345339 A1 | 11/2017 | Normand | |

OTHER PUBLICATIONS

Vata, "0555—'Annie' Arterial Insufficiency Leg." VATA Inc. (2015). https://www.youtube.com/watch?v=fKiglawDTH0 (Year: 2015).*

Edmonds, Michael E, and A V M Foster. âDiabetic foot ulcers.â BMJ (Clinical research ed.) vol. 332,7538 (2006): 407-10. doi: 10.1136/bmj.332.7538.407 (Year: 2006).*

Gnyawali SC et al. "High-Resolution Harmonics Ultrasound Imaging for Non-Invasive Characterization of Wound Healing in a Pre-Clinical Swine Model." PLoS ONE 10(3) (2015): e0122327. doi: 10.1371/journal.pone.0122327 (Year: 2015).*

Puri, M., Patil, K.M., Balasubramanian, V. et al. "Texture analysis of foot sole soft tissue images in diabetic neuropathy using wavelet transform." Med. Biol. Eng. Comput. 43, 756â763 (2005). https://doi.org/10.1007/BF02430954 (Year: 2005).*

Wong, Brittany et al. âExperimental simulation of non-ballistic wounding by sharp and blunt punches. a Forensic science, medicine, and pathology vol. 4,4 (2008): 212-20. doi: 10.1007/s12024-008-9042-z (Year: 2008).*

VATA, "Annie Arterial Insufficiency Leg—0555." VATA Inc. (2023). https://vatainc.com/wp-content/uploads/2023/02/0555-AnnieLegend-e8.pdf (Year: 2023) (Year: 2023).*

VATA, "0555—'Annie' Arterial Insufficiency Leg." VATA Inc. (2015). https://Awww.youtube.com/watch?v=fKiglawDTHO (Year: 2015) (Year: 2015).*

Edmonds, Michael E, and A V M Foster. "Diabetic foot ulcers." BMJ (Clinical research ed.) vol. 332,7538 (2006): 407-10. doi: 10.1136/bmj.332.7538.407 (Year: 2006) (Year: 2006).*

Gnyawali SC et al. "High-Resolution Harmonics Ultrasound Imaging for Non-Invasive Characterization of Wound Healing in a Pre-Clinical Swine Model." PLoS ONE 10(3) (2015): e0122327. doi: 10.1371/journal.pone.0122327 (Year:2015) (Year: 2015).*

Zhang, P. et al., Global epidemiology of diabetic foot ulceration: a systematic review and meta-analysis, Annals of Medicine, 2017, 49:2, 106-116.

Jackson, Adam et al., Developing a Grapefruit Model for Assessment and Training of Diabetic Foot Ulcer Debridement, Simulation in Healthcare: The Journal of the Society for Simulation in Healthcare: Oct. 2014—vol. 9—Issue 5—p. 331-336.

Ogurtsova, K., et al., IDF Diabetes Atlas: Global estimates for the prevalence of diabetes for 2015 and 2040, Diabetes Research and Clinical Practice, vol. 128, 2017, pp. 40-50.

\* cited by examiner

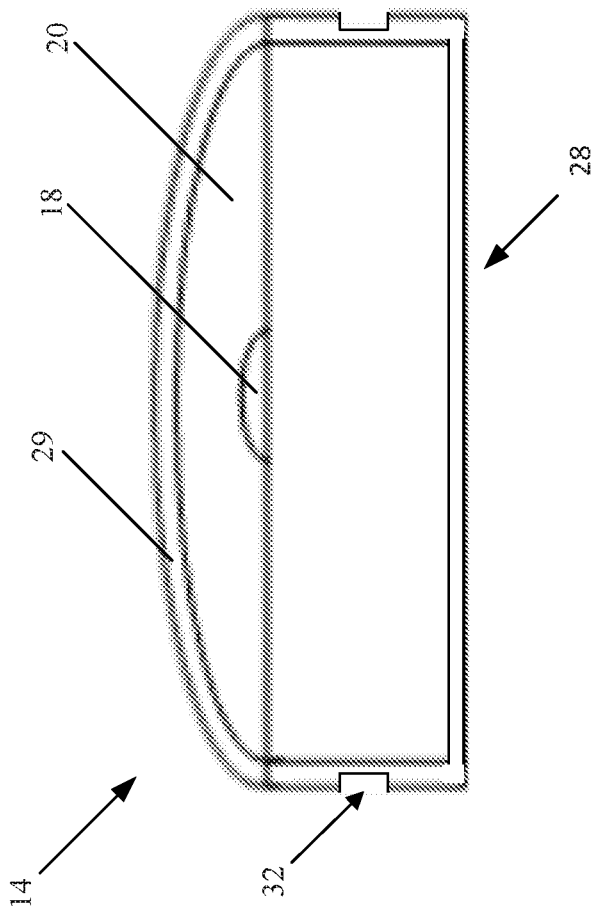
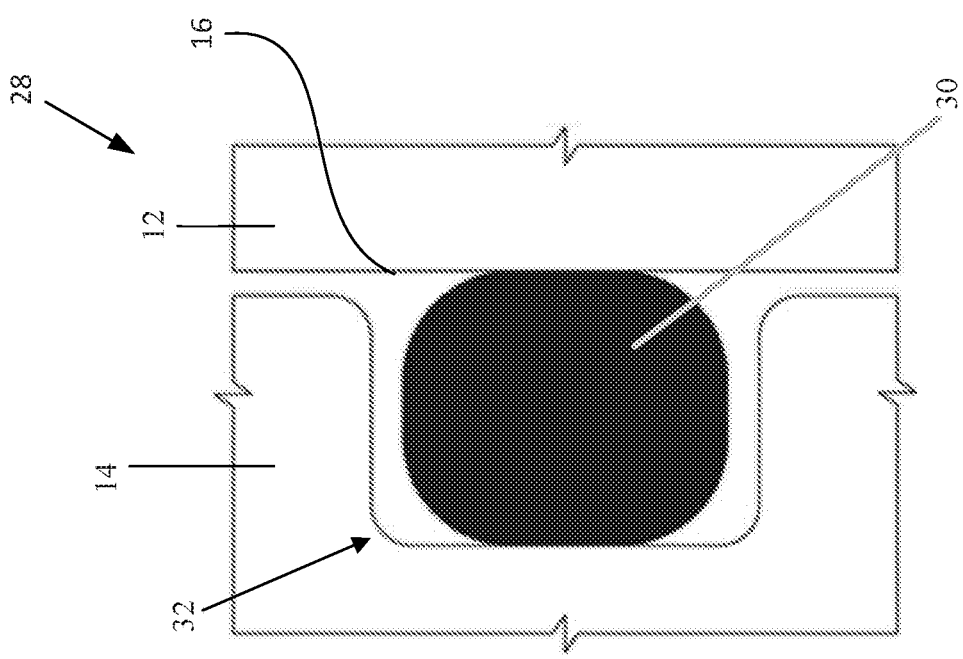
FIG. 3b
FIG. 3a

APPARATUS AND METHOD FOR TEACHING WOUND DEBRIDEMENT

CROSS-REFERENCE TO RELATED APPLICATIONS

This application represents the national stage entry of PCT/US2020/018873 filed on Feb. 19, 2020 and claims benefit of, and claims priority to U.S. Provisional Patent Application No. 62/808,461 filed on Feb. 21, 2019, which is hereby incorporated herein by reference for its entirety for all purposes.

BACKGROUND

Care of chronic wounds is a growing specialty, as leg and foot wounds become more prevalent worldwide. Teaching about wound care to primary care providers, podiatrists, and physical therapists is ongoing and essential. Debriding wounds is a commonly needed skill, but one that learners struggle with. Diabetic neuropathic wounds, which leave a dense callous with central ulcer, are common. In the U.S.A., 10% of diabetics will develop diabetic neuropathic wounds. World-wide, 6% of diabetics will develop diabetic neuropathic wounds. Debriding of dead or calloused tissue is an essential part of the healing process (along with pressure offloading). Currently, no commercial models are available to assist in teaching wound debridement, and the only published model available for simulated debridement is an orange.

Thus, it would be helpful to provide a model on which students, learning about wound care, can practice the process of debridement as it would take place on a patient.

SUMMARY OF THE PRESENT DISCLOSURE

The present disclosure provides an apparatus and method for teaching the process of wound debridement through the use of a physical model. In some embodiments, the apparatus may include a removable member with a variable density filling that students can cut and trim to simulate the debridement process.

In one embodiment of the invention, an apparatus for teaching wound debridement is provided, comprising a model of a body part comprising a receiving portion and a removable member comprising a variable density filling comprising a polymer. The removable member can be sized and shaped to simulate a wound, the receiving portion can be configured to receive the removable member, and the removable member can be removably coupled to the model by an attachment device.

In some embodiments, the variable density filling can include a gradient of hardness that decreases from an exterior of the simulated wound to an interior of the simulated wound. The variable density filling can include a plurality of layers of differing hardness, wherein each of the plurality of layers is parallel to the exterior of the simulated wound. The removable member can include an ulcer zone, a dense callous zone, and a soft callous zone. The ulcer zone may be disposed exteriorly on the removable member. The dense callous zone can extend radially outward from the ulcer zone. The soft callous zone can extend radially outward from the dense callous zone. The variable density filling may include the dense callous zone and the soft callous zone, and the variable density filling can include a gradient of hardness that decreases as the variable density filling extends radially outward from the ulcer zone.

In some embodiments, dense callous zone can include a Shore A hardness between 40 and 80. The soft callous zone can include a Shore A hardness between 18 and 28. The variable density filling can include one or more layers and the one or more layers can be differentially colored to simulate the depth of human tissues in a wound. The variable density filling can define a truncated conical shape. Alternatively, the variable density filling can define a cylindrical shape. The attachment device can include a threaded rod and a threaded hole, the threaded rod can be disposed on one of the removable member or the model and the threaded hole can be disposed on the other of the removable member or the model. In some embodiments, the body part is a human foot and the removable member is sized and shaped to simulate a diabetic neuropathic wound.

In another embodiment, an apparatus for teaching wound debridement is provided comprising a model of a body part including a receiving portion, the receiving portion configured to receive a removable member, the removable member being selectively coupled to the model by an attachment device. The removable member can be sized and shaped to simulate a wound, including an ulcer zone disposed exteriorly on the removable member. The removable member can comprise a variable density filling, the variable density filling comprising one or more polymers and including a gradient of hardness that decreases as the variable density filling extends linearly away from the ulcer zone. The variable density filling can include at least two layers, the at least two layers being differently colored to simulate the depth of human tissues. The variable density filling can include a layer that is colored to correspond to viable human tissue.

In some embodiments, at least one layer of the variable density filling can include a Shore A hardness between 45 and 85, and at least one layer of the variable density filling can include a Shore A hardness between 30 and 45. The body part can be a human foot and the removable member can be sized and shaped to simulate a diabetic neuropathic wound.

In yet another embodiment, a method for teaching wound debridement is provided. The method comprises providing a teaching apparatus according to an embodiment of the invention and at least partially removing the variable density filling with a surgical instrument. Further, the method can include stopping the removal of the variable density filling when a color corresponding to the depth of viable human tissue is exposed and replacing the removable member.

In some embodiments, the variable density filling can include a plurality of layers of differing hardness, such that each of the plurality of layers is parallel to an exterior of the simulated wound. The method can further comprising stopping the removal of the variable density filling when a color corresponding to the depth of viable human tissue is exposed. The method can further comprise replacing the removable member after the variable density filling has been at least partially removed. Additionally, the method may further include the step of coupling the removable member to the model with the attachment device.

The foregoing and other aspects and advantages of the present disclosure will appear from the following description. In the description, reference is made to the accompanying drawings that form a part hereof, and in which there is shown by way of illustration one or more exemplary versions. These versions do not necessarily represent the full scope of the invention.

BRIEF DESCRIPTION OF THE DRAWINGS

The following drawings are provided to help illustrate various features of example embodiments of the disclosure.

FIG. 3a shows a partial cross-section view of an attachment device of an apparatus for teaching wound debridement according to an embodiment of the invention;

FIG. 3b shows a cross-sectional view of a removable member of an apparatus for teaching wound debridement according to an embodiment of the invention;

DETAILED DESCRIPTION OF THE PRESENT DISCLOSURE

Figure 1:
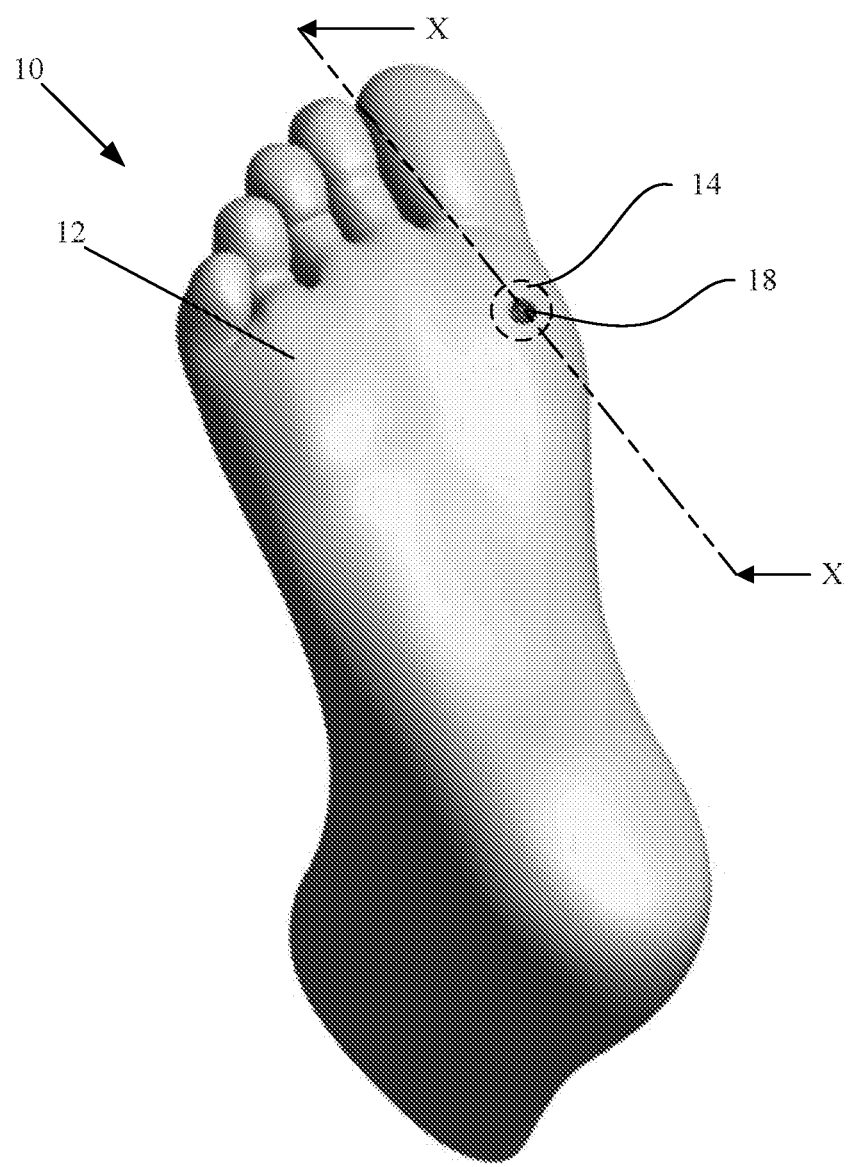
FIG. 1 shows an apparatus for teaching wound debridement according to an embodiment of the invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

In various embodiments, an apparatus and method for teaching wound debridement are disclosed. As noted above, wound care is a prevalent specialty affecting many areas of healthcare. Debridement for wounds, such as diabetic neuropathic wounds, corns, and other callouses, is a commonly needed skill but one that students struggle to learn without hands-on practice or experience. Debridement is a surgical procedure that consists of removing dead or calloused tissue from a wound to promote overall healing of the wound. An apparatus is provided in embodiments of the invention that simulate the structure of a wound, such as a diabetic neuropathic wound, as it relates to debridement. It is generally accepted educational policy with surgical procedures for students to learn on a simulated model before working on live patients. Therefore, an apparatus can be provided that simulates how to remove the dead callous, how deep to cut, and what the wound should look like once the debridement process is complete.

Figure 2:
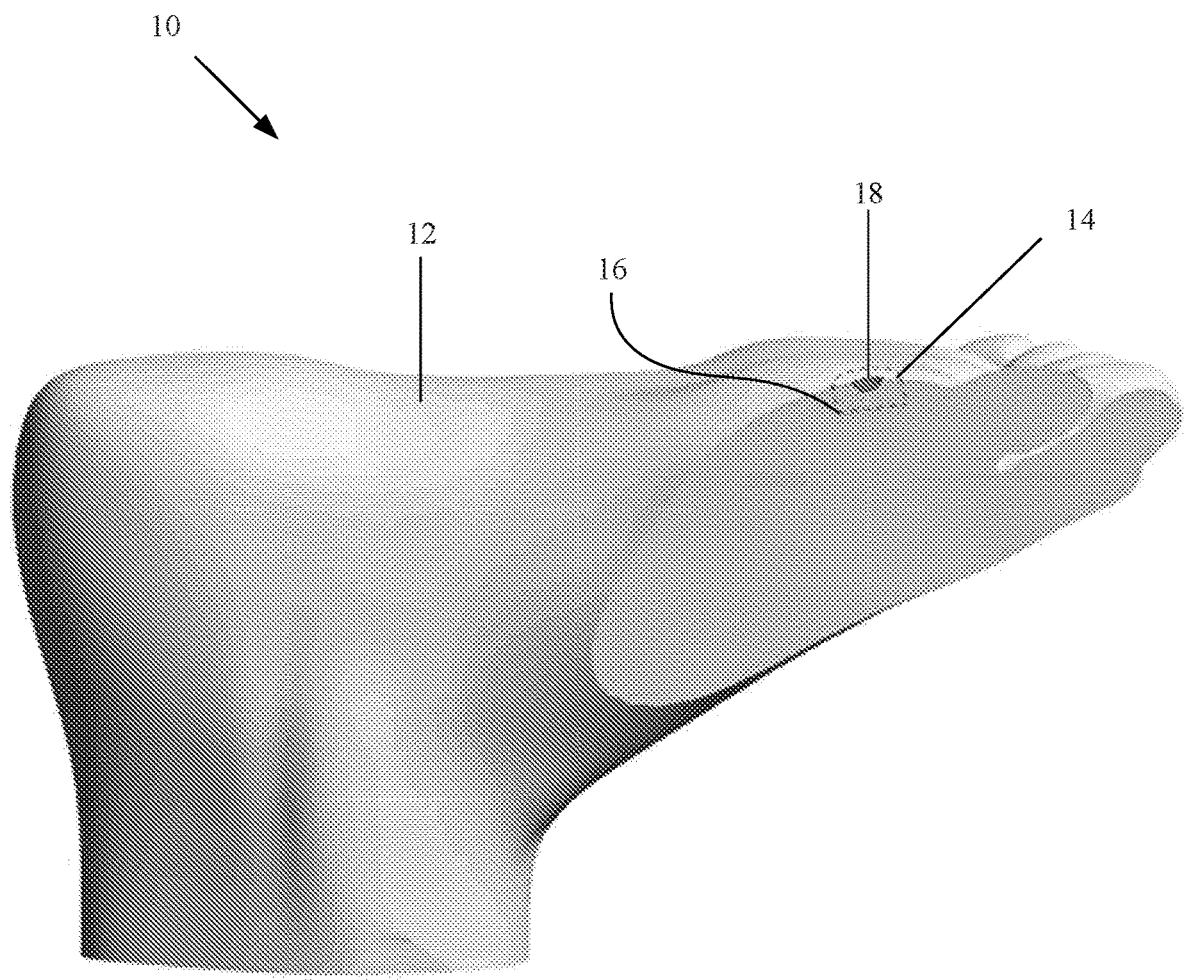
FIG. 2 shows a partial cross-sectional view of the apparatus of FIG. 1 taken along plane X-X of FIG. 1.

Referring to FIGS. 1 and 2, an apparatus for teaching wound debridement 10 is illustrated. A model 12 of a body part can simulate, as shown in FIGS. 1 and 2, a human foot. Other body parts can also be simulated, such as, for example, a lower leg, upper back, hip, or other body part prone to developing a chronic wound such as a pressure ulcer. A removable member 14 represents a simulated size and location of a diabetic neuropathic wound. The wound is typically circular in shape with a diameter between 1 cm and 2 cm and generally includes an ulcer zone 18 disposed exteriorly on the removable member 14. Although depicted herein in a circular form, the removable member 14 can also be configured to simulate a variety of other wound sizes and shapes. The removable member 14 can also be formed to simulate a corn or a dense callous without an ulcer. The removable member 14 is illustrated in dashed lines, representing the removable member 14 fitting securely within a receiving portion 16 of the model 12. The removable member 14 is removably coupled to the model 12 by an attachment device.

The removable member 14 can be removably coupled to the model 12 by a variety of attachment devices 28, 28', 28", 28''', such as via an O-ring and groove, magnetic coupling, a keyhole slot and screw, various pin and slot configurations, a threaded rod and threaded hole, among others. The attachment device provides ease of coupling and decoupling of the removable member 14 from the model 12, while also securing the removable member 14 during debridement simulation. In some embodiments, attachment device 28 is integrated with a member wall 29 and is configured as an O-ring 30 and groove 32 as illustrated by FIGS. 3a and 3b. Groove 32 extends around the circumference of removable member 14, and groove 32 is sized and shaped to receive O-ring 30. With O-ring 30 seated in groove 32, removable member 14 can be inserted into receiving portion 16 of the model 12, compressing O-ring 30, and providing a friction fit between the removable member 14 and the model 12.

Figure 3C:
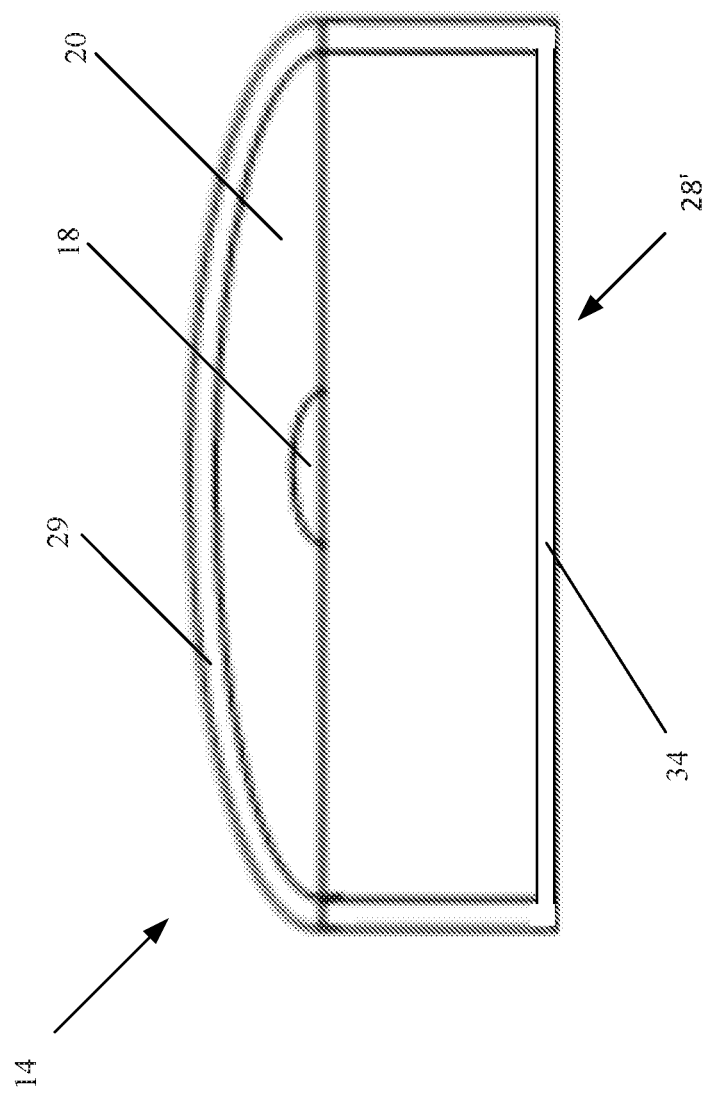
FIG. 3c shows a cross-sectional view of a removable member of an apparatus for teaching wound debridement according to an embodiment of the invention.

In some embodiments, the attachment device 28' is configured as a magnetic coupling, where a sheet 34, comprised of a material that responds to magnetic force, is included on a mating, outer face of removable member 14, as shown in FIG. 3c. The sheet 34 can be located on only the bottom face of the removable member 14, only the outer circumferential face of the removable member 14, on all faces contacting receiving portion 16, or any portion of the removable member 14 and member wall 29 that contacts receiving portion 16. The receiving portion 16 can include a permanent magnet, thereby attracting removable member 14 and providing a magnetic coupling.

Figure 3D:
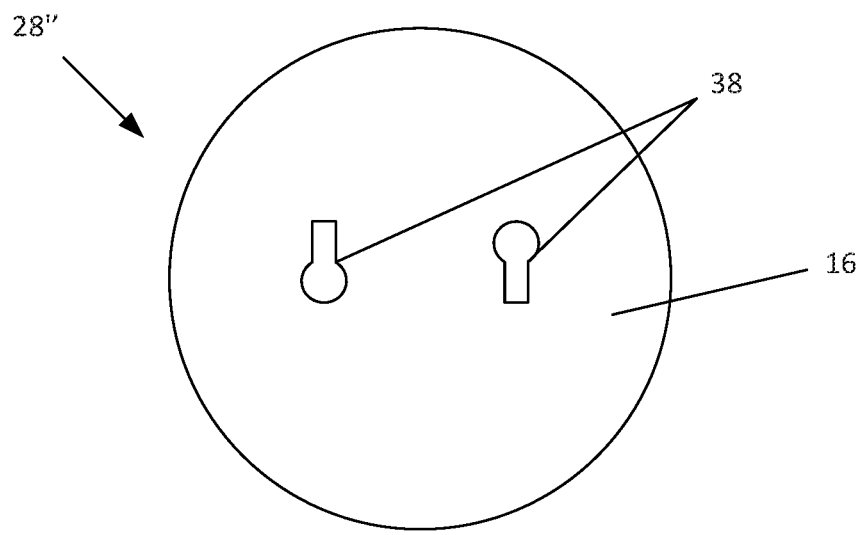
FIG. 3d shows a receiving portion of an apparatus for teaching wound debridement according to an embodiment of the invention.
Figure 3E:
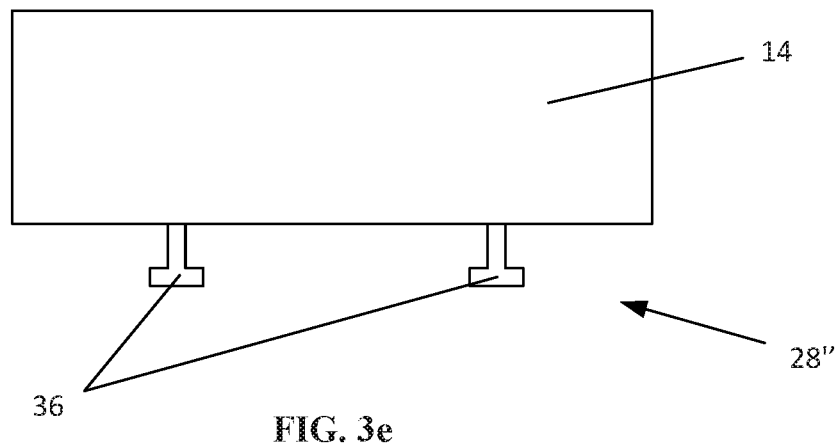
FIG. 3e shows a removable member of an apparatus for teaching wound debridement according to an embodiment of the invention.

In some embodiments, the attachment device 28" is configured as keyhole slot and screw configuration, as shown in FIGS. 3d and 3e. Keyhole slots 38 can extend into the base of the receiving portion 16 and the heads of screws 36 can protrude from the bottom face of removable member 14. The heads of screws 36 are received into the keyhole slots 38 and the removable member 14 is rotated about a central axis until the contact between screws 36 and keyhole slots 38 provides sufficient friction to hold the removable member 14 in place during debridement simulation.

Figure 3F:
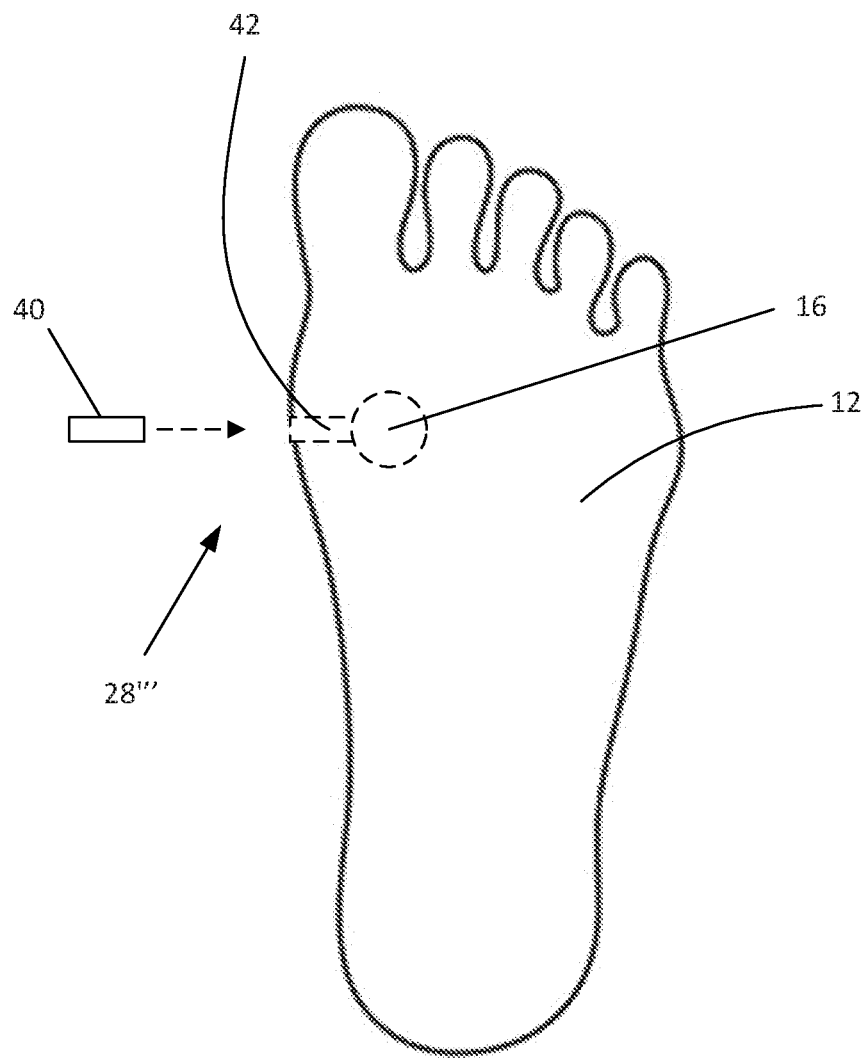
FIGS. 3f-g show an attachment device of an apparatus for teaching wound debridement according to an embodiment of the invention.
Figure 3G:
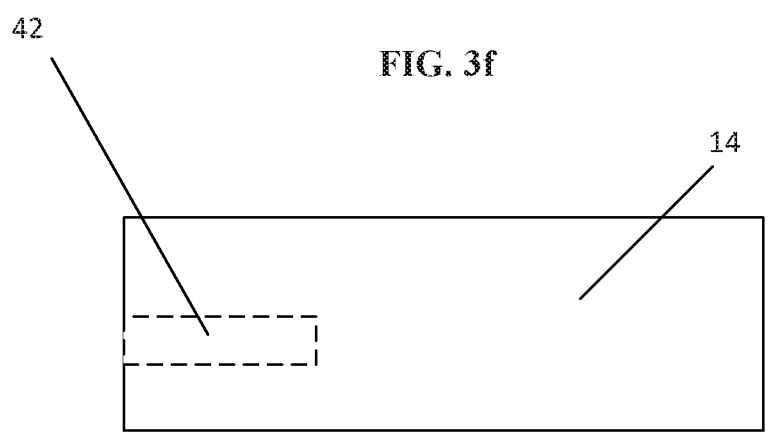

In some embodiments, the attachment device 28''' is configured as a pin and hole, as illustrated in FIGS. 3f and 3g. A pin 40 can be inserted into a hole 42, which extends through both model 12 and the member wall 29 of removable member 14. When removable member 14 is properly received into and aligned within receiving portion 16, the pin 40 can be inserted into hole 42 through model 12 and into removable member 14, thereby coupling the model 12 and removable member 14 together. Attachment device 28''' inherently prevents rotation and axial movement of removable member 14 while the pin 40 is in place, which secures the removable member 14 during debridement simulation.

In some embodiments, the attachment device can include, for example, a threaded rod and a threaded hole. The threaded rod can be disposed on one of the removable member 14 or the model 12, and the threaded hole on the other of the removable member 14 or the model 12. In some embodiments, the attachment device can include an adhesive, covering at least part of the bottom of the removable member 14 opposite the ulcer zone 18, which allows the removable member 14 to be sufficiently adhered to the model 12 while students apply surgical cutting force to the removable member 14.

The attachment device can be configured as a combination of any of the preceding embodiments, for example, the attachment device can include a pin and slot in addition to a magnetic coupling. Further, any attachment device configuration can include two pins extending from the bottom face of the removable member 14, the two pins being received into two complimentary holes in the receiving portion 16 (and vice versa, e.g., pins extending from receiving portion 16, complimentary holes in removable member 14). The two-pin extension prevents the removable member 14 from rotating in the receiving portion 16 while debridement is simulated.

Figure 4A:
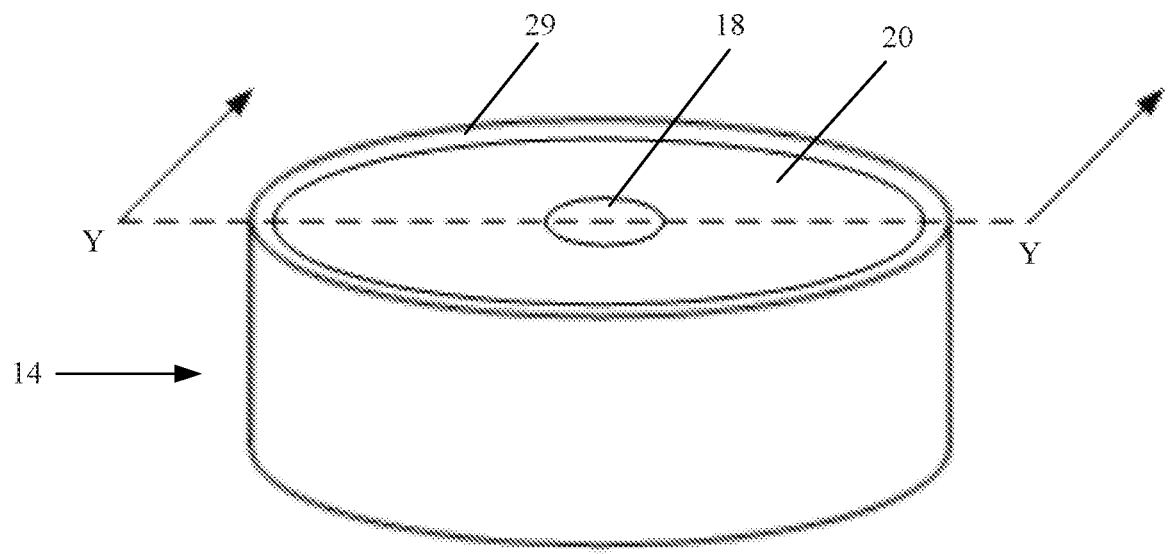
FIG. 4a shows a removable member of an apparatus for teaching wound debridement according to an embodiment of the invention.
Figure 4B:
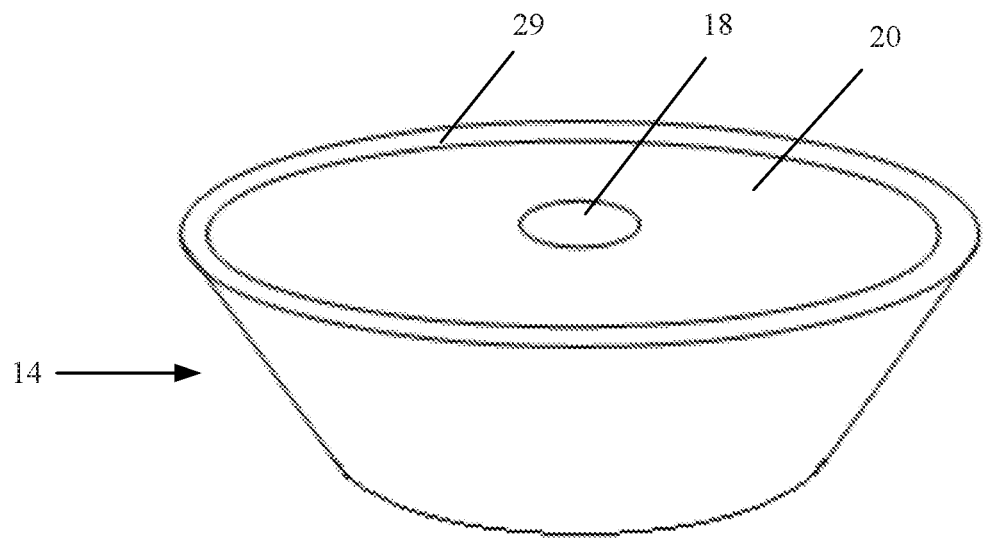
FIG. 4b shows a removable member of an apparatus for teaching wound debridement according to an embodiment of the invention.

Referring further to FIGS. 4a and 4b, the removable member 14 can be formed as a cylinder, a truncated cone, or an irregular shape that is similar or substantially similar to a cylinder or a truncated cone. FIGS. 4a and 4b illustrate the ulcer zone 18, a variable density filling 20, and the attachment device 28. The variable density filling 20 is surrounded by the member wall 29, and comprises one or more polymers, such as thermoplastic urethane, polyurethane, flexible polyvinyl chloride, or thermoplastic rubber. In one embodiment, the member wall 29 comprises plastic. In another embodiment, the member wall 29 comprises metal.

Figure 5A:
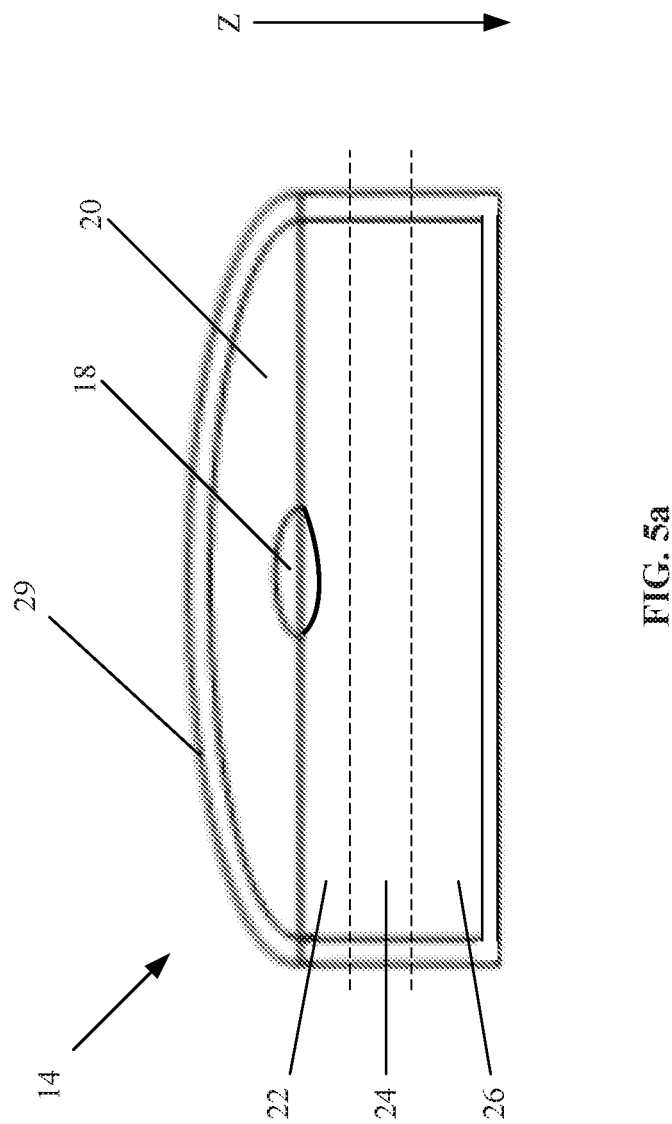
FIG. 5a shows a cross-sectional view of the removable member of FIG. 4a taken along plane Y-Y.

Further illustrated in FIG. 5a is a cross-sectional view of the removable member 14 along plane Y-Y of FIG. 4a. FIG. 5a shows the variable density filling 20 having a gradient of hardness that decreases from the exterior of the simulated wound (top) to the interior of the simulated wound (middle), for example, in an approximately linear manner as depicted by arrow Z. A dense callous zone 22 is formed around, and just beneath, the ulcer zone 18 at the exterior of the simulated wound. A soft callous zone 24 is located farther interiorly within the simulated wound. Even farther interiorly within the simulated wound is a viable tissue zone 26. The dense callous zone 22 may have a Shore A hardness between about 20 and 100, or a Shore A hardness between about 40 and 80, or a Shore A hardness of about 60. Additionally, the dense callous zone 22 may have a tear resistance between about 10 and 70 pounds per inch, or between about 20 and 50 pounds per inch, or about 40 pounds per inch. The callous zone 22 may further have a tensile strength between about 300 and 800 pounds per square inch, or between about 500 and 600 pounds per square inch, or about 550 pounds per square inch.

The soft callous zone 24 may have a Shore A hardness between about 25 and 45. The viable tissue zone 26 may have a Shore A hardness between about 10 and 40, or a Shore A hardness between about 18 and 28, or a Shore A hardness of about 23. Additionally, the viable tissue zone 26 may have a tear resistance between about 50 and 200 pounds per inch, or between about 90 and 130 pounds per inch, or about 110 pounds per inch. The viable tissue zone 26 may further have a tensile strength between about 200 and 600 pounds per square inch, or between about 400 and 500 pounds per square inch, or about 450 pounds per square inch. In one embodiment, the density filling 20 includes XP-696 silicone rubber.

In general, the variable density filling 20 can include one or more distinct layers that include one or more polymers, respectively, which achieve a desired hardness. The variable density filling 20 can also be a single material which includes one or more polymers that decrease in hardness in a continuous or stepwise manner from the exterior of the simulated wound to the interior of the simulated wound. In the case of a stepwise change in hardness, in various embodiments the variable density filling 20 may include two, three, four, or other numbers of layers having different hardness levels, where the layers are aligned approximately parallel to the exterior surface of the simulated wound as shown in FIG. 5a. In some embodiments, the variable density filling includes silicone elastomers. Although in many embodiments the filling is presented as having a variable density, particular embodiments of the filling may be made of a material or materials having a substantially uniform density.

Figure 5B:
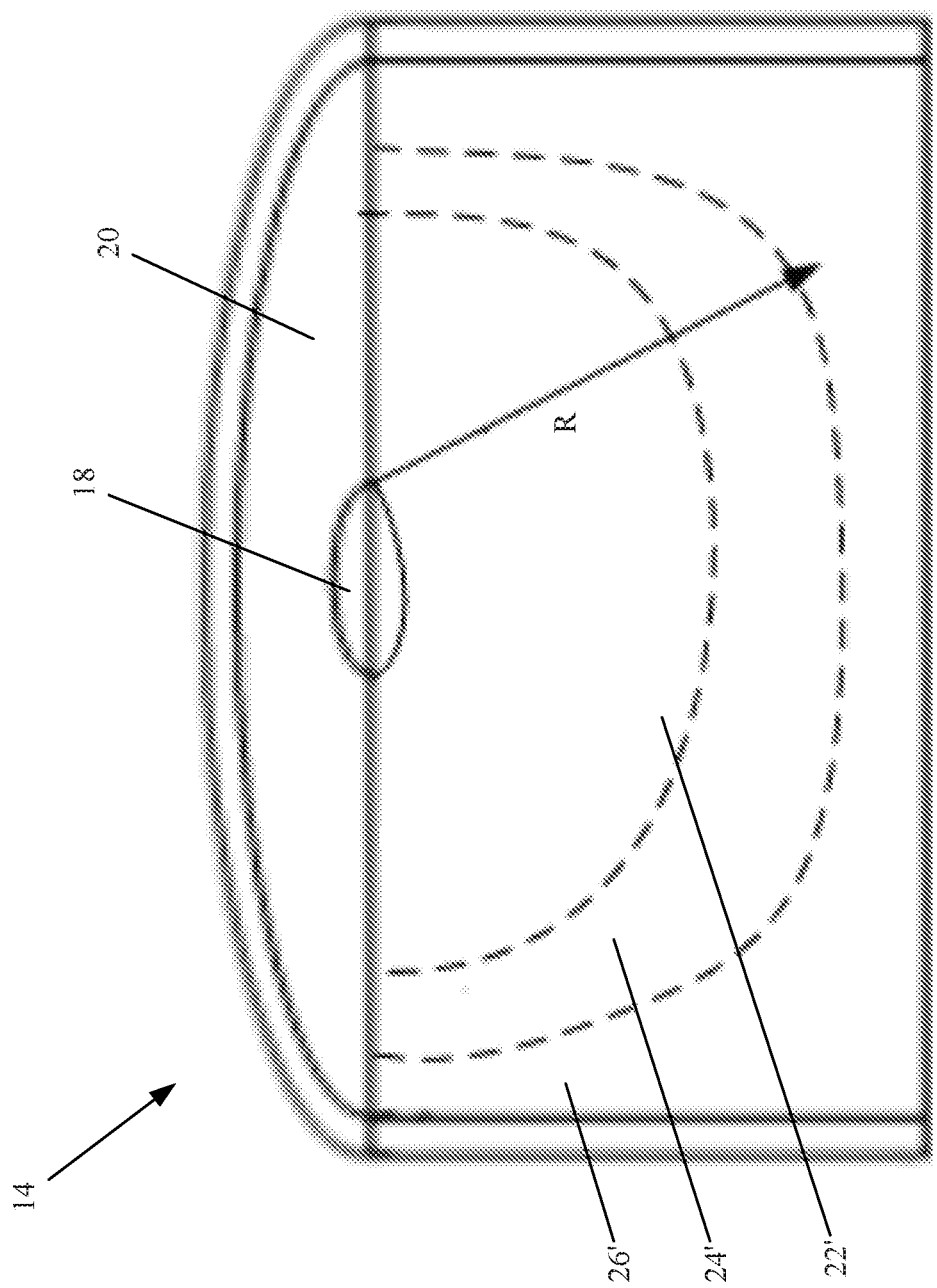
FIG. 5b shows a cross-sectional view of a removable member of an apparatus for teaching wound debridement according to an embodiment of the invention.

FIG. 5b illustrates an embodiment of the removable member 14 wherein the variable density filling 20 includes a gradient of hardness that decreases as the variable density filling extends radially outward from the ulcer zone 18, as depicted by arrow R. One or more layers of the variable density filling 20 are illustrated by the dashed lines in FIG. 5b. The dense callous zone 22' extends radially outward from the ulcer zone 18 and the soft callous zone 24' extends radially outward from the dense callous zone 22'. Similar to the embodiment shown in FIG. 5a, the variable density filling 20 can be a single material which includes one or more polymers with a radial gradient of hardness, a single material with multiple layers, or multiple materials and multiple layers.

The variable density filling 20 can include color coding for one or more of the layers, which corresponds to both the gradient of hardness as well as the relevant wound tissue modeled by the hardness of the variable density filling 20 at a particular depth. For example, the dense callous zone 22, 22', having a Shore A hardness of 45-85 can be a tan color, the soft callous zone 24, 24', having a Shore A hardness of 30-45 can be a pink color, and the viable tissue zone 26, 26' can be a deep red color. The density filling 20 can further include a thin silicone layer (not shown) that is configured to represent flesh and has a pink color. Multiple variations of the variable density filling 20 are contemplated so that as a student cuts away from the exterior to the interior of the simulated wound, the material decreases in hardness, and the variable density filling 20 reveals different coloration with depth to indicate to the student when debridement is almost complete and when debridement is completed.

The thickness of each simulated zone—dense callous zone 22, 22', soft callous zone 24, 24', and viable tissue zone 26, 26'—is not necessarily shown to scale in FIGS. 5a and 5b, but rather is representative of the contemplated gradient of hardness and the differentiated layers, which can be indicated by color coding. Depending on the wound simulated, the thicknesses of the various zones 22, 22', 24, 24', 26, 26' might differ relative to one another. For example, the soft callous zone 24, 24' might be one-third the thickness of the dense callous zone 22, 22', the thicknesses being 1 mm for soft callous zone 24, 24' and 3 mm for the dense callous zone 22, 22'.

A method of teaching wound debridement is also provided, using an apparatus for teaching wound debridement according to an embodiment of the invention as described above. The method includes at least partially removing the variable density filling 20 with a surgical instrument. In general, an unused removable member 14 will first be coupled to the model 12 with the attachment device 28. A surgical instrument, or instruments, such as forceps, a scalpel, and scissors, can then be used to begin removing the variable density filling 20 around the ulcer zone 18. As the dense callous zone 22, 22' of the variable density filling 20 is removed, the color of the soft callous zone 24, 24' will be revealed (i.e., in those embodiments in which the layers are provided with different colors), indicating that debridement is close to complete. The hardness of the exposed variable density filling 20 will decrease as the variable density filling 20 is removed, providing additional information to the person practicing on the model. Once the color corresponding to the viable tissue zone 26, 26' is revealed, removal of the variable density filling 20 is ceased because the debridement simulation is complete. The used removable member 14 is then removed from the model 12, and the used removable member 14 is replaced with an unused removable member 14.

Figure 6A:
FIG. 6a shows a photograph of a patient's foot with a diabetic neuropathic wound before debridement.
Figure 6B:
FIG. 6b shows a photograph of a patient's foot with a diabetic neuropathic wound after debridement.

In this way, the apparatus for teaching wound debridement provides a realistic simulation of wound debridement for students, by allowing hands-on removal of material that corresponds to actual wound tissues in hardness and in color differentiation. An example of diabetic neuropathic wound, similar to a wound that may be modeled by an embodiment of the invention, is shown in FIG. 6a. Further, FIG. 6b a picture of the wound following debridement, where the dead callous tissue has been removed to uncover bleeding, healthy, viable tissue. Thus, the apparatus and method described herein provide an improvement over simulating the appearance of and process for wound debridement to create an effective teaching model for students learning about wound care.

Each of the following references is incorporated by reference in its entirety for all purposes:
1. Pengzi Zhang, Jing Lu, Yali Jing, Sunyinyan Tang, Dalong Zhu & Yan Bi (2017) Global epidemiology of diabetic foot ulceration: a systematic review and meta-analysis, Annals of Medicine, 49:2, 106-116, DOI: 10.1080/07853890.2016.1231932.
2. Jackson, Adam MBChB; Rajbhandari, Satyan M D (2014) Developing a Grapefruit Model for Assessment and Training of Diabetic Foot Ulcer Debridement, Simulation in Healthcare: The Journal of the Society for Simulation in Healthcare: October 2014—Volume 9—Issue 5—p 331-336 doi: 10.1097/SIH.0000000000000046.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. An apparatus for teaching wound debridement comprising:
 a model of a body part comprising a receiving portion; and
 a removable member comprising a member wall, wherein the member wall surrounds a variable density filling comprising a polymer,
  the removable member being sized and shaped to simulate a wound in need of debridement,
  the receiving portion being configured to receive the removable member, and
  the removable member being removably coupled to the model by an attachment device,
 wherein the member wall and the variable density filling are removed together with the removable member, and
 wherein the member wall is made from a different material than the variable density filling.

2. The apparatus of claim 1, wherein the variable density filling includes a gradient of hardness that decreases from an exterior of the simulated wound to an interior of the simulated wound.

3. The apparatus of claim 2, wherein the variable density filling comprises a plurality of layers of differing hardness, wherein each of the plurality of layers is parallel to the exterior of the simulated wound.

4. The apparatus of claim 1, wherein the removable member includes an ulcer zone, a dense callous zone, and a soft callous zone,
 wherein the ulcer zone is disposed exteriorly on the removable member,
 wherein the dense callous zone extends radially outward from the ulcer zone,
 wherein the soft callous zone extends radially outward from the dense callous zone,
 wherein the variable density filling comprises the dense callous zone and the soft callous zone, and
 wherein the variable density filling comprises a gradient of hardness that decreases as the variable density filling extends radially outward from the ulcer zone.

5. The apparatus of claim 4, wherein the dense callous zone includes a Shore A hardness between 40 and 80.

6. The apparatus of claim 4, wherein the soft callous zone includes a Shore A hardness between 18 and 28.

7. The apparatus of claim 1, wherein the variable density filling comprises one or more layers and the one or more layers are differentially colored to simulate the depth of human tissues in a wound.

8. The apparatus of claim 1, wherein the variable density filling defines a truncated conical shape.

9. The apparatus of claim 1, wherein the variable density filling defines a cylindrical shape.

10. The apparatus of claim 1, wherein the attachment device includes a threaded rod and a threaded hole, the threaded rod being disposed on one of the removable member or the model and the threaded hole being disposed on the other of the removable member or the model.

11. The apparatus of claim 1, wherein the body part is a human foot and the removable member is sized and shaped to simulate a diabetic neuropathic wound.

12. The apparatus of claim 1, wherein the member wall comprises at least one of plastic or metal.

13. A method of teaching wound debridement comprising:
providing a teaching apparatus including a model of a body part, a removable member comprising a variable density filling and a member wall surrounding the variable density filling, the removable member being sized and shaped to simulate a wound in need of debridement and the variable density filling comprising one or more polymers, wherein the model includes a receiving portion configured to receive the removable member and the removable member is selectively coupled to the model by an attachment device; and
at least partially removing the variable density filling with a surgical instrument,
wherein the member wall and the variable density filling are removed together with the removable member, and
wherein the member wall is made from a different material than the variable density filling.

14. The method of claim 13, wherein the variable density filling comprises a plurality of layers of differing hardness, wherein each of the plurality of layers is parallel to an exterior of the simulated wound; and
further comprising removing at least one of the plurality of layers with a surgical instrument.

15. The method of claim 13, wherein the variable density filling comprises one or more layers and the one or more layers are color coded to simulate the depth of human tissues in a wound; and
further comprising stopping the removal of the variable density filling when a color corresponding to the depth of viable human tissue is exposed.

16. The method of claim 13, further comprising replacing the removable member after the variable density filling has been at least partially removed.

17. The method of claim 13, further comprising the step of coupling the removable member to the model with the attachment device.

18. An apparatus for teaching wound debridement comprising:
a model of a body part including a receiving portion, the receiving portion configured to receive a removable member, the removable member being selectively coupled to the model by an attachment device;
the removable member being sized and shaped to simulate a wound in need of debridement including an ulcer zone disposed exteriorly on the removable member, the removable member comprising a member wall surrounding a variable density filling, the variable density filling comprising one or more polymers, the variable density filling including a gradient of hardness that decreases as the variable density filling extends linearly away from the ulcer zone, the variable density filling including at least two layers, the at least two layers being differently colored to simulate the depth of human tissues; and
the variable density filling including a layer colored to correspond to viable human tissue,
wherein the member wall and the variable density filling are removed together with the removable member, and
wherein the member wall is made from a different material than the variable density filling.

19. The apparatus of claim 18, wherein at least one layer of the variable density filling includes a Shore A hardness between 45 and 85 and at least one layer of the variable density filling includes a Shore A hardness between 30 and 45.

20. The apparatus of claim 18, wherein the body part is a human foot and the removable member is sized and shaped to simulate a diabetic neuropathic wound.

* * * * *